(12) United States Patent
Ishigami et al.

(10) Patent No.: US 10,503,984 B2
(45) Date of Patent: Dec. 10, 2019

(54) OBJECT DETECTION DEVICE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Hirotake Ishigami, Kariya (JP); Toshihiko Terada, Kariya (JP); Hiroaki Ito, Toyota (JP)

(73) Assignees: DENSO CORPORATION, Kariya, Aichi-pref. (JP); TOYOTA JIDOSHA KABUSHIKI KAISHA, Toyota-shi, Aichi-pref. (JP)

( * ) Notice: Subject to any disclaimer, the term of this patent is extended or adjusted under 35 U.S.C. 154(b) by 76 days.

(21) Appl. No.: 15/836,559

(22) Filed: Dec. 8, 2017

(65) Prior Publication Data

US 2018/0165529 A1 Jun. 14, 2018

(30) Foreign Application Priority Data

Dec. 12, 2016 (JP) .................. 2016-240682

(51) Int. Cl.
*G06K 9/00* (2006.01)
*G06T 7/593* (2017.01)
*G06T 7/00* (2017.01)
*G06T 7/73* (2017.01)
*B60R 1/00* (2006.01)
*H04N 13/128* (2018.01)
(Continued)

(52) U.S. Cl.
CPC ............ *G06K 9/00805* (2013.01); *B60R 1/00* (2013.01); *G01B 11/00* (2013.01); *G06K 9/621* (2013.01); *G06T 7/0002* (2013.01); *G06T 7/593* (2017.01); *G06T 7/73* (2017.01); *G08G 1/0962* (2013.01); *G08G 1/16* (2013.01); *H04N 13/128* (2018.05);
(Continued)

(58) Field of Classification Search
CPC combination set(s) only.
See application file for complete search history.

(56) References Cited

U.S. PATENT DOCUMENTS

2007/0206833 A1   9/2007 Otsuka et al.
2008/0309517 A1*  12/2008 Saito .................. B60R 1/00
                                                340/937
(Continued)

FOREIGN PATENT DOCUMENTS

JP     2000-123151     4/2000

*Primary Examiner* — Jose L Couso
(74) *Attorney, Agent, or Firm* — Knobbe, Martens, Olson & Bear, LLP

(57) ABSTRACT

In an object detection device, a distance image generation part generates a distance image based of a pair of brightness images transmitted from a stereo camera. A road surface estimation part estimates a road surface based on the generated distance image. An object detection part groups together positions having a distance value located on/over the estimated road surface and satisfying a predetermined relationship, and detects an object based on the grouped positions. An abnormality detection part detecting occurrence of image abnormality in the brightness image captured during a current detection period. The road surface estimation part estimates the road surface at the current detection period based on the road surface estimated at the previous detection period when the abnormality detection part detects the occurrence of image abnormality in the brightness image captured during the current detection period.

9 Claims, 6 Drawing Sheets

(51) Int. Cl.
  *G01B 11/00* (2006.01)
  *G08G 1/16* (2006.01)
  *G06K 9/62* (2006.01)
  *G08G 1/0962* (2006.01)
  *H04N 13/239* (2018.01)
  *H04N 13/00* (2018.01)
  *B60S 1/04* (2006.01)

(52) U.S. Cl.
  CPC ...... *H04N 13/239* (2018.05); *B60R 2300/103* (2013.01); *B60R 2300/107* (2013.01); *B60R 2300/304* (2013.01); *B60R 2300/8093* (2013.01); *B60S 1/04* (2013.01); *G06T 2207/10021* (2013.01); *G06T 2207/30168* (2013.01); *G06T 2207/30261* (2013.01); *G08G 1/165* (2013.01); *G08G 1/166* (2013.01); *H04N 2013/0081* (2013.01)

(56) References Cited

U.S. PATENT DOCUMENTS

| | | | | |
|---|---|---|---|---|
| 2009/0135065 | A1 | 5/2009 | Tsuchida et al. | |
| 2009/0184845 | A1* | 7/2009 | Saito | G06K 9/00805 340/937 |
| 2009/0190800 | A1* | 7/2009 | Takahashi | G06K 9/00805 382/104 |
| 2009/0190827 | A1* | 7/2009 | Saito | G06K 9/00805 382/154 |
| 2009/0243823 | A1* | 10/2009 | Takahashi | G06K 9/00805 340/435 |
| 2009/0244263 | A1 | 10/2009 | Saito | |
| 2013/0129148 | A1 | 5/2013 | Nanri et al. | |
| 2014/0198955 | A1 | 7/2014 | Deigmoeller et al. | |
| 2015/0227800 | A1* | 8/2015 | Takemae | B60R 1/00 382/104 |
| 2015/0279017 | A1* | 10/2015 | Tamura | G06K 9/00791 382/103 |
| 2015/0334269 | A1* | 11/2015 | Yokota | G06K 9/00805 382/103 |
| 2016/0180181 | A1* | 6/2016 | Seo | G06T 7/593 348/46 |
| 2017/0098132 | A1* | 4/2017 | Yokota | G06T 7/285 |
| 2018/0137375 | A1* | 5/2018 | Takemura | B60R 21/00 |
| 2019/0107886 | A1* | 4/2019 | Saisho | G01C 21/3635 |
| 2019/0130752 | A1* | 5/2019 | Takaki | B60R 21/00 |
| 2019/0187290 | A1* | 6/2019 | Kim | G01S 7/4861 |
| 2019/0205662 | A1* | 7/2019 | Samal | B60R 1/00 |

* cited by examiner

FIG.2
BRIGHTNESS IMAGE CAPTURED DURING PREVIOUS DETECTION PERIOD BY LEFT HAND SIDE CAMERA 11
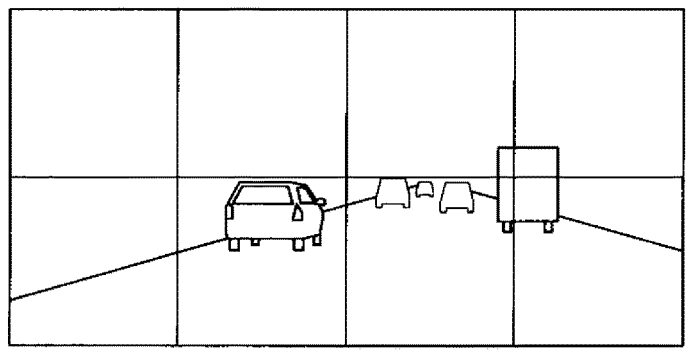
BRIGHTNESS IMAGE CAPTURED DURING PREVIOUS DETECTION PERIOD BY RIGHT HAND SIDE CAMERA 12
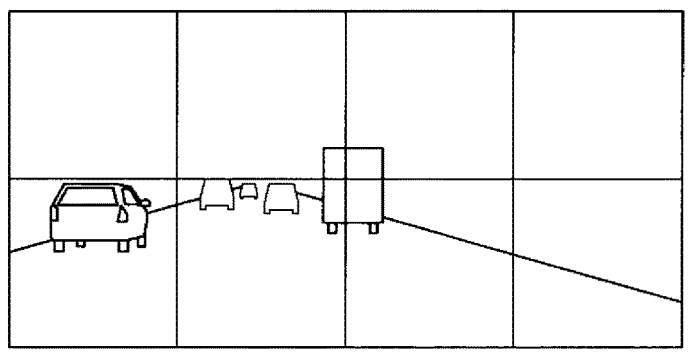
FIG.3
DISTANCE IMAGE GENERATED BASED ON BRIGHTNESS IMAGE SHOWN IN FIG. 2
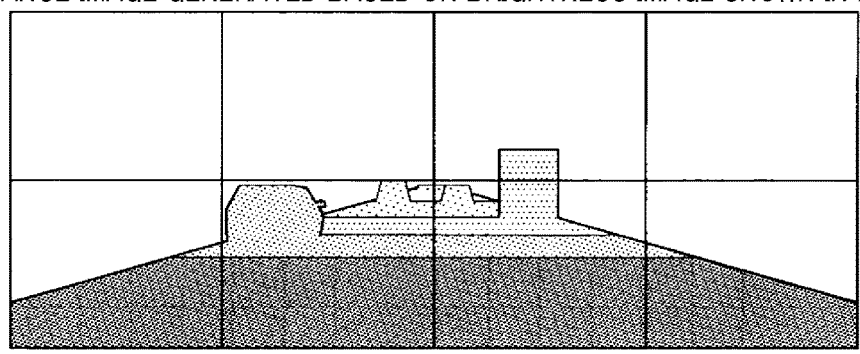

FIG.4
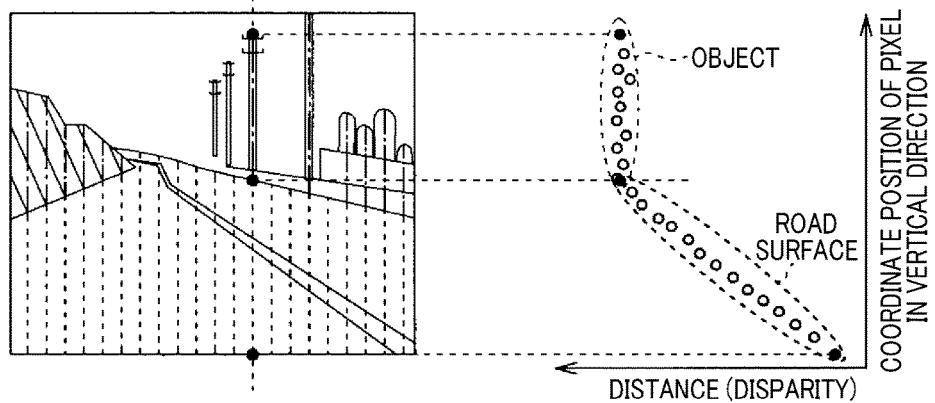
FIG.5
BRIGHTNESS IMAGE,
WHICH CONTAINS IMAGE
OF WIPER BLADE 31,
CAPTURED DURING CURRENT
DETECTION PERIOD BY
LEFT HAND SIDE CAMERA 11
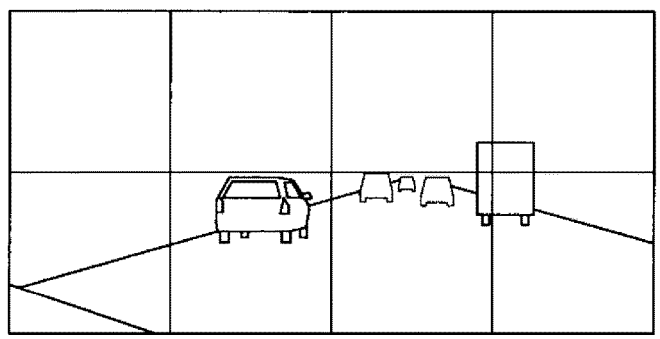
BRIGHTNESS IMAGE,
WHICH CONTAINS IMAGE
OF WIPER BLADE 31,
CAPTURED DURING CURRENT
DETECTION PERIOD BY
RIGHT HAND SIDE CAMERA 12
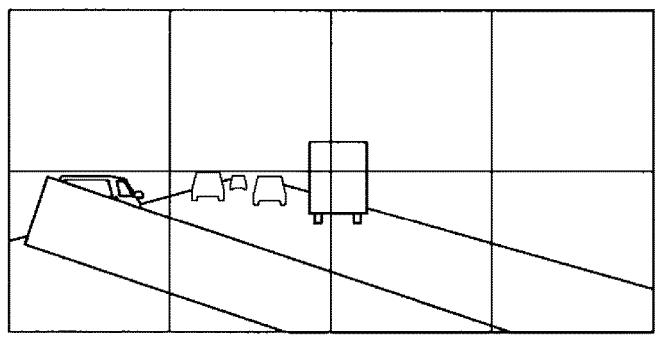

DISTANCE IMAGE GENERATED BASED ON BRIGHTNESS IMAGE SHOWN IN FIG. 5

FIG.8
(REFERENCE EXAMPLE)
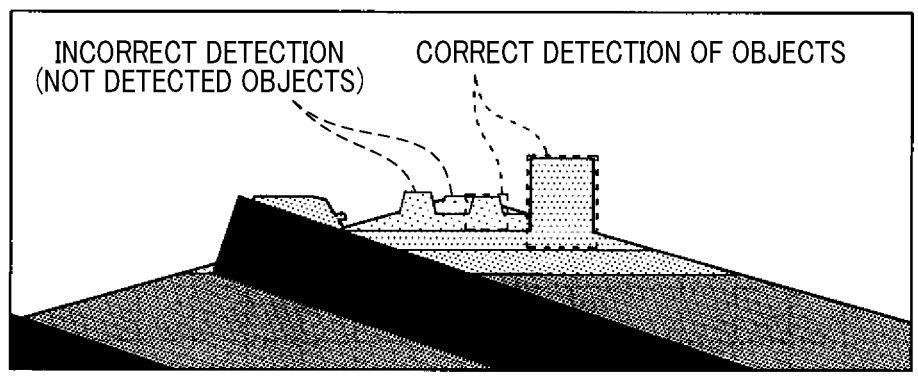
(PRESENT INVENTION)
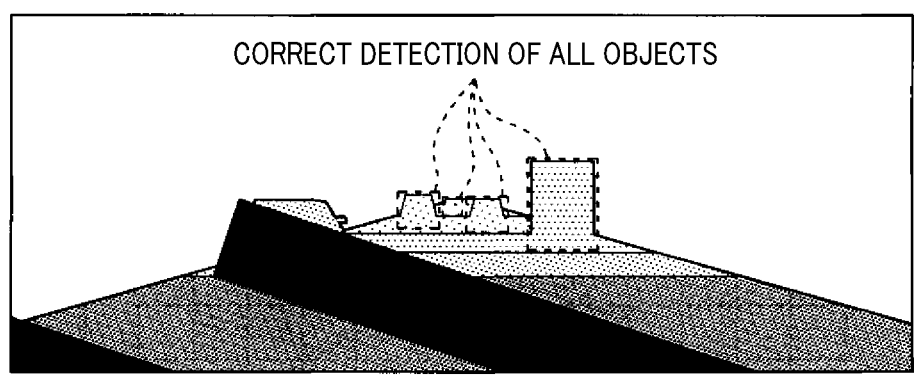

OBJECT DETECTION DEVICE

CROSS-REFERENCE TO RELATED APPLICATION

This application is related to and claims priority from Japanese Patent Application No. 2016-240682 filed on Dec. 12, 2016, the contents of which are hereby incorporated by reference.

BACKGROUND OF THE INVENTION

1. Field of the Invention

The present invention relates to object detection devices for detecting an object in front of an own vehicle

2. Description of the Related Art

Recently, there have been developed and provided driver assist systems such as collision safe devices and vehicle following driving devices performing adoptive cruise control for safe driving. Because such driver assist systems are required to correctly detect presence of obstacles such as other vehicles, which are running in front of an own vehicle, and traffic objects located ahead. Accordingly, there have been developed various types of vehicles equipped with such an obstacle detection device. An obstacle detection device detects presence of obstacles such as another vehicles ahead, traffic objects, etc. on the basis of a pair of corresponding images captured by and transmitted from a pair of cameras which form a stereo camera mounted on an own vehicle.

There is a conventional method for analyzing a pair of brightness images captured by and transmitted from the stereo camera mounted on the own vehicle. The pair of brightness images are referred to as a first brightness image and a second brightness image. The conventional method estimates a disparity between a pixel block in the first image and a pixel block in the second image which correlates with the pixel image in the first image. The conventional method generates a disparity map. The conventional method then estimates a road surface on the basis of the generated disparity map. The conventional method extracts objects which are present on/over the estimated road surface.

However, such a conventional method has deteriorated calculation accuracy of calculating a disparity of an area including a target object which is far away from the position of the own vehicle on the basis of the pair of brightness images obtained by the stereo camera, and the conventional method often provides an incorrect detection result which detects, as a target object, a traffic mark painted on the road surface on which the own vehicle drives.

In order to avoid occurrence of such an incorrect detection, patent document 1, PCT international publication No. WO 2012/017650, estimates a road surface on the basis of disparity maps, and extracts a position of the target object which is present on/over the road surface on the basis of the disparity maps and the estimated road surface. Further, this generates a target object detection area which includes a surrounding area of the target object, and determines whether the target object is a target or a road surface on the basis of shape characteristics of the target object.

Because such a stereo camera is often mounted on a central part of a rear view mirror arranged in the passenger compartment of the own vehicle, there occurs a possible case in which one of wiper blades is contained in a brightness image captured by the stereo camera on a rainy day, for example. In this case, it is difficult for the conventional method disclosed by the patent document 1 previously explained to estimate the disparity of the area which contains the image area of the wiper blade, and to provide a disparity map generated on the basis of unclear images. This reduces an estimation accuracy of the road surface on the basis of the disparity map, and also reduces the detection accuracy of various objects which are present on/over the road surface.

SUMMARY

It is therefore desired to provide an object detection device which estimates a road surface of the road on which an own vehicle drives even if temporary image abnormality occurs in a pair of brightness images captured by and transmitted from a stereo camera mounted on the own vehicle.

An exemplary embodiment provides an object detection device which receives a pair of brightness images as front views in front of an own vehicle every predetermined detection period, transmitted from a stereo camera comprised of a left hand side camera and a right hand side camera. The stereo camera captures a pair of brightness images. The object detection device has a computer system including a central processing unit. The computer system is configured to provide a distance image generation part, a road surface estimation part, a road surface estimation part, an object detection part, and an abnormality detection part. The distance image generation part generates a distance image, which represents a distribution of a distance value corresponding to a position on the brightness images on the basis of the pair of brightness images. The road surface estimation part estimates a road surface on the basis of the distance image generated by the distance image generation part. The object detection part groups together positions having a distance value located on/over the road surface estimated by the road surface estimation part which satisfy a predetermined relationship, and detects objects on the basis of the grouped positions. The abnormality detection part compares at least one of the pair of brightness images and the distance image obtained at the current detection period with a corresponding brightness image or distance image obtained at a previous detection period which is before a current detection period, and detects occurrence of image abnormality in the brightness image captured during the current detection period on the basis of the comparison result. In the object detection device, the road surface estimation part estimates the road surface at the current detection period on the basis of the road surface estimated at the previous detection period when the abnormality detection part detects the occurrence of abnormality in the brightness image or the distance image obtained at the current detection period.

The object detection using such a stereo camera is required to estimate a road surface with high accuracy because of detecting various types of objects which are located on/over the road surface of the road on which the own vehicle drives. The road surface is estimated on the basis of a distance image which has been generated on the basis of a pair of brightness images captured by a left hand side camera and a right hand side camera in the stereo camera.

In a case in which image abnormality occurs in one of the pair of brightness images captured during the current detection period, and no image abnormality occurs in a brightness image captured in a previous detection period, which corresponds to the brightness image containing the image abnormality, because the distance image is generated on the basis of the pair of brightness images, the generated distance image contains an abnormality area such as a distance abnormality. In this case, it is difficult to estimate a road surface around the area in which abnormality occurs with high accuracy, and this reduces the object detection accuracy.

In order to solve this problem previously described, the object detection device according to the present invention has the abnormality detection part which is configured to compare at least one of the pair of brightness images and the distance image with a corresponding brightness image or distance image obtained at a previous detection period, and to detect occurrence of image abnormality in the brightness image or the distance image obtained at the current detection period on the basis of the comparison result.

When the abnormality detection part detects that abnormality occurs in the image obtained at the current detection image, the road surface estimation part estimates the road surface at the current detection period on the basis of the road surface estimated at the previous detection period. Because the stereo camera mounted on the own vehicle captures and updates brightness images at a high speed, it can be considered to generate a large difference between the road surface estimated at the current detection period and the road surface estimated at the previous detection period. Accordingly, it is possible for the object detection device according to the present invention to correctly estimate the road surface with high accuracy in the brightness image captured at the current detection period on the basis of the road surface estimated at the previous detection period, when compared with the process of estimating the road surface on the basis of the brightness image containing a temporarily abnormality area.

BRIEF DESCRIPTION OF THE DRAWINGS

A preferred, non-limiting embodiment of the present invention will be described by way of example with reference to the accompanying drawings, in which:

FIG. 2 is a schematic view showing a pair of brightness images captured by a stereo camera mounted on the own vehicle at a previous detection period;

FIG. 3 is a schematic view showing a distance image generated on the basis of the pair of brightness images shown in FIG. 2;

FIG. 4 is a view showing a method of estimating a road surface on the basis of the distance image shown in FIG. 3;

FIG. 5 is a schematic view showing a pair of brightness images containing an image of a wiper blade of the own vehicle captured at a current detection period;

FIG. 8 is a view showing various effects provided by the object detection device according to the exemplary embodiment of the present invention which performs the object detection control process shown in FIG. 7.

DETAILED DESCRIPTION OF THE PREFERRED EMBODIMENTS

Figure 1:
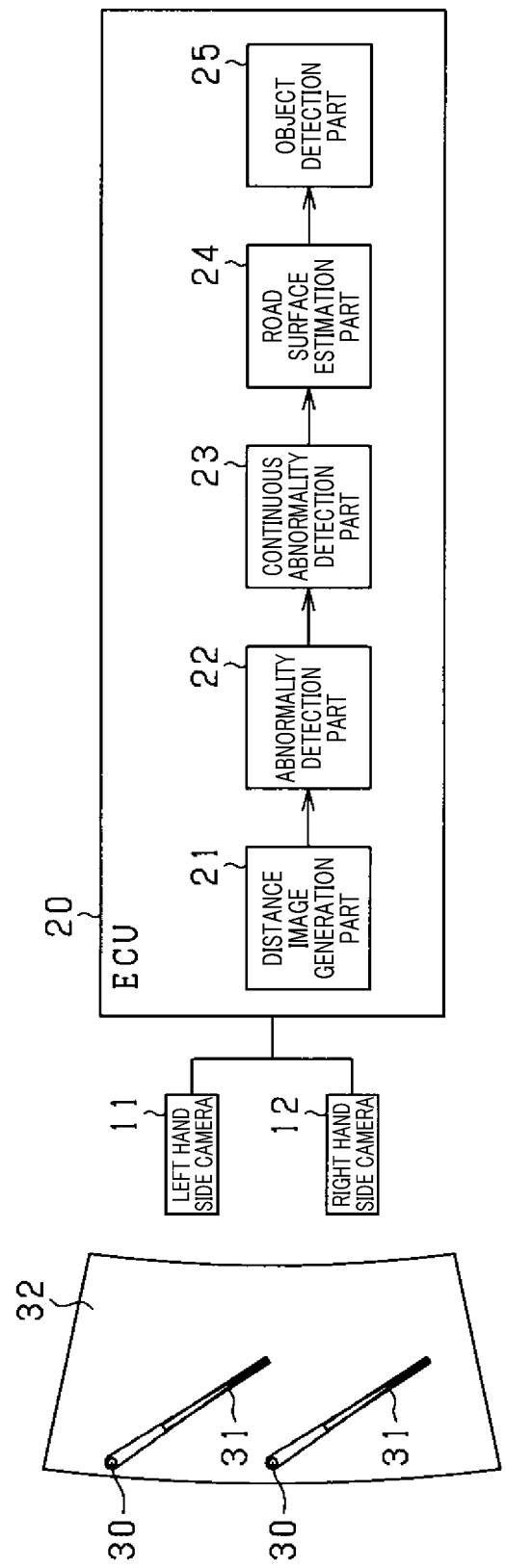
FIG. 1 is a block diagram showing a structure of an object detection device according to an exemplary embodiment of the present invention, which is mounted on an own vehicle.

Hereinafter, various embodiments of the present invention will be described with reference to the accompanying drawings. In the following description of the various embodiments, like reference characters or numerals designate like or equivalent component parts throughout the several diagrams.

EXEMPLARY EMBODIMENT

A description will be given of an object detection device according to an exemplary embodiment with reference to FIG. 1 to FIG. 8.

FIG. 1 is a block diagram showing a schematic structure of the object detection device according to the exemplary embodiment. The object detection device is mounted on an own vehicle, and detects objects which are present around the own vehicle and on/over the road surface of the road on which the own vehicle drives. The own vehicle is equipped with a wiper device 30, i.e. a windshield wiper device so as to provides a clear view of the road ahead, and provide safe visibility. The wiper device 30 has a pair of wiper blades 31.

The object detection device according to the exemplary embodiment is mounted on the own vehicle equipped with a stereo camera and the wiper device 30 as a windshield wiper device. The stereo camera is composed of a left hand side camera 11 and a right hand side camera 12. The object detection device has an electronic control unit (ECU) 20. The ECU 20 receives a pair of brightness images captured by and transmitted from the left hand side camera 11 and the right hand side camera 12 which form the stereo camera. The ECU 20 detects objects around the own vehicle on the basis of the pair of the brightness images.

Each of the left hand side camera 11 and the right hand side camera 12 is composed of a charge coupled device (CCD) image sensor, a metal oxide semiconductor (MOS) image sensor, or a near-infrared sensor. The left hand side camera 11 and the right hand side camera 12 are arranged at a left hand side and a right hand side of the rear view mirror of the own vehicle. The left hand side camera 11 and the right hand side camera 12 capture front views within a predetermined angle ahead the own vehicle. The left hand side camera 11 transmits the left hand side brightness image to the ECU 20 every predetermined time interval. Similarly, the right hand side camera 12 transmits the right hand side brightness image to the ECU 20 every predetermined time interval. A brightness value represents a degree of light and dark of each brightness image.

The ECU 30 is a microcomputer system composed of a central processing unit (CPU), a read only memory (ROM), a random access memory (RAM), input/output (I/O) ports, etc. The CPU in the ECU 20 performs programs stored in the ROM so as to generate the functions of each of a distance image generation part 21, an abnormality detection part 22, a continuous abnormality detection part 23, a road surface estimation part 24, and an object detection part 25.

The distance image generation part 21 generates a distance image on the basis of the pair of brightness images transmitted from the left hand side camera 11 and the right hand side camera 12.

FIG. 2 is a schematic view showing the pair of brightness images captured by the left hand side camera 11 and the right hand side camera 12 in the stereo camera mounted on the own vehicle at a previous detection period. For example, the distance image generation part 21 generates the brightness images shown in FIG. 1. The pair of brightness images shown in FIG. 2 are obtained on the basis of the brightness images captured by the left hand side camera 11 and the right hand side camera 12. A disparity or a parallax is generated between the brightness images by a difference in lateral position in a wide direction of the own vehicle. That is, there is a one to one correspondence between a disparity or a parallax of an object and a distance measured from a focal point of the left hand side camera 11, and a distance measured from a focal point of the right hand side camera 12.

That is, the disparity shows distance information which represent a distance from the position of the own vehicle to a target object in a real space. The distance image generation part 21 calculates a disparity per pixel in the pair of brightness images, and generates a distance image which represents a distribution of distance information of the object which is present around the own vehicle, i.e. at the measurement point. FIG. 3 is a schematic view showing the distance image generated by the distance image generation part 21 on the basis of the pair of brightness images shown in FIG. 2. In the distance image shown in FIG. 3, the nearer the position measured from the own vehicle is, the more the hatching becomes dark.

The abnormality detection part 22 and the continuous abnormality detection part 23 will be explained later.

The road surface estimation part 24 performs the estimation of the position and shape of a road surface on the basis of the distance image generated by the distance image generation part 21. FIG. 4 is a view showing a method of estimating a road surface on the basis of the distance image shown in FIG. 3. The lefts die image in FIG. 4 shows a distance image which is different from the distance image shown in FIG. 3.

The right hand side image in FIG. 4 represents a two dimensional virtual plane which shows a relationship between a position and a coordinate position per pixel in a vertical line in the distance image generated by the distance image generation part 21. This virtual plane shows a two dimensional space, the vertical line thereof represents a coordinate position of a pixel in the vertical direction, and a horizontal line thereof represents the distance information, i.e. the distance. This virtual plane is referred to as the V-disparity space. The road surface estimation part 24 estimates as a road surface a line formed by plot points in the V-disparity space.

The object detection part 25 groups, i.e. selects areas close in position to each other on/over the road surface estimated by the road surface estimation part 24. The object detection part 25 detects an object in each grouped area (see the left hand side view). Thereby, the object detection part 25 detects the objects which are located at a different distance measured from the position of the own vehicle.

Because the left hand side camera 11 and the right hand side camera 12 are arranged at a left side and a right side of the rear view mirror of the own vehicle, there occurs a possible case in which at least one of brightness images captured by the left hand side camera 11 and the right hand side camera 12 contains the image of the wiper blade 31 when the own vehicle is driving on a rainy day. The presence of the wiper blade 31 in the brightness image drastically changes a degree of brightness of the area including the wiper blade 31. As a result, this drastic change in brightness of the area including the wiper blade 31 will reduce the reliability of the distance image of the distribution of the distance information corresponding to this area, and reduce the estimation accuracy of the road surface by the road surface estimation part 24. As a result, the object detection part 25 provides a reduced detection accuracy of detecting the target object.

In order to avoid this drawback, as shown in FIG. 1, the ECU 20 as the object detection device according to the exemplary embodiment has the abnormality detection part 22 and the continuous abnormality detection part 23. The operation of each of the abnormality detection part 22 and the continuous abnormality detection part 23 will be explained later. The abnormality detection part 22 and the continuous abnormality detection part 23 perform the judgment process so as to detect whether at least one of the brightness images captured by the left hand side camera 11 and the right hand side camera 12 contains the image of the wiper blade 31.

The own vehicle is equipped with the wiper device 30, i.e. the windshield wiper device has the wiper blades 31. The wiper blades 31 are used to remove foreign matter such as dust, rain, snow, ice and debris adhered on a windshield glass 32 of the own vehicle form the windshield glass 32. The wiper blades 31 generally consist of metal arms, pivoting at one end and with a long rubber blade attached to the other. The arm is powered by a motor, often an electric motor. The wiper blades 31 are swung back and forth over the glass, pushing water or other precipitation from its surface. For this reason, the possibility for a newly obtained brightness image to continuously contain the image of the wiper blade 31 again is low even if the current brightness image contains the image of the wiper blade 31. In other words, the wiper blades 31 operate in a reciprocating motion on the windshield glass 32 of the own vehicle during the moving operation of the wiper device 30.

Accordingly, the abnormality detection part 22 compares a brightness image captured during a current detection period with the brightness image having no image of the wiper blade 31 captured during a previous detection period, and detects when image abnormality occurs in at least one of the brightness images captured during the current detection period.

It is possible to use, as the previous detection period, a detection period one or several periods before when the left hand side camera 11 and the right hand side camera 12 capture the pair of brightness images as front view images in front of the own vehicle, a detection period one or several periods before when the ECU 20 performs the object detection control.

Because the distance image is generated by using the pair of brightness images captured by the left hand side camera 11 and the right hand side camera 12, the distance image may contain distance abnormality due to the image abnormality of the pair of brightness images. Accordingly, the abnormality detection part 22 compares the distance image obtained at the previous detection period with the distance image obtained at the current-detection period, and detects whether distance abnormality is generated in the distance image on the basis of the comparison result.

A description will now be given of the detailed explanation of the judgment process performed by the abnormality detection part 22. In the following explanation, the brightness images shown in FIG. 2 have been captured by the left hand side camera 11 and the right hand side camera 12, respectively during a previous detection period. The distance image shown in FIG. 3 is obtained on the basis of the brightness images shown in FIG. 2.

Figure 6:
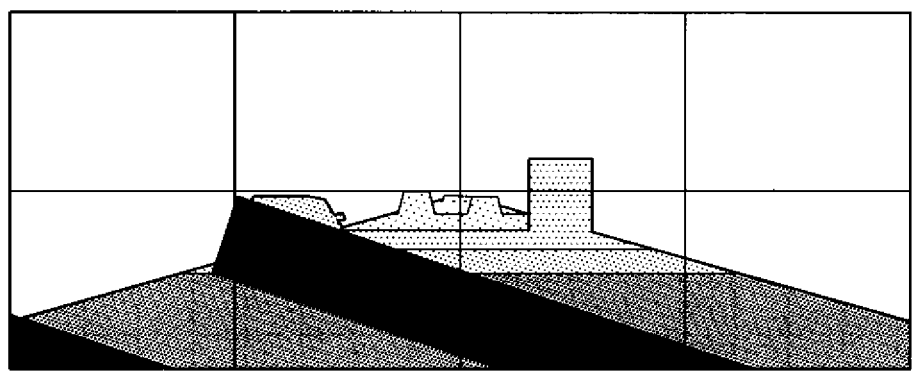
FIG. 6 is a schematic view showing a distance image generated on the basis of the pair of the brightness images shown in FIG. 5.

The brightness images shown in FIG. 5 are captured by the left hand side camera 11 and the right hand side camera 12, respectively during a current detection period. The distance image shown in FIG. 6 is generated on the basis of the brightness images shown in FIG. 5. That is, FIG. 6 is a schematic view showing the distance image generated on the basis of the pair of the brightness images shown in FIG. 5.

The abnormality detection part 22 divides each of the brightness images captured by the left hand side camera 11 and the right hand side camera 12 into eight divided areas, and calculates an average brightness value in each of the eight divided areas.

By the way, the wiper blade 31 has an elongated shape so as to sweep the overall area of the windshield glass 32 and to remove foreign matter such as dust, rain, snow, ice, debris, etc. from the surface of the windshield glass 32 when the wiper device 30 is driven. For this reason, when the image of the wiper blade 31 is contained in the brightness image, there would be a large difference in brightness value between not less than two divided areas in the brightness image. In order to solve this problem, the abnormality detection part 22 calculates an average brightness value in each of the divided areas in each of the images shown in FIG. 2 and FIG. 5. That is, FIG. 5 is a schematic view showing the pair of brightness images containing the image of the wiper blade 31 captured at the current detection period.

The abnormality detection part 22 detects whether there are at least two divided areas, in at least one of the brightness images, having a brightness differential value of not less than a first threshold value.

Similarly, as shown in FIG. 3 and FIG. 6, the abnormality detection part 22 divides each distance image into eight divided areas. The abnormality detection part 22 calculates, as an average distance value, an average value of disparity as the distance information in each of the divided areas.

The abnormality detection part 22 calculates a distance differential value which is a difference between the average distance value obtained on the basis of the distance image shown in FIG. 3 and the average distance value obtained on the basis of the distance image shown in FIG. 6. The abnormality detection part 22 detects whether there are at least two divided areas, each of which has a distance differential value which is more than a second threshold value, in each pair of the divided areas which correspond in position to each other between the divided areas in the distance image shown in FIG. 3 and the divided areas in the distance image shown in FIG. 6.

When the detection results indicate that there are not less than two divided areas having a brightness differential value which is more than the first threshold value and there are not less than two divided areas having a distance differential value which is more than the second threshold value in at least one of the brightness images, the abnormality detection part 22 determines that image abnormality occurs in at least one of the pair of brightness images captured during the current detection period. Accordingly, the abnormality detection part 22 corresponds to an abnormality judgment part, an average brightness value calculation part, a brightness differential value calculation value, an average distance value, and a distance differential value calculation part.

The abnormality detection part 22 detects occurrence of image abnormality in at least one of the brightness images captured during the current detection period when bird droppings are adhered on the windshield glass 32 of the own vehicle and the bird droppings are contained in two divided areas in at least one of the brightness images.

When the image of such bird droppings adhered on the windshield glass 32 is contained in two divided areas in at least one of the pair of brightness images, the brightness images continuously contain the image of the bird droppings obtained in the following detection period unless the bird droppings are removed from the surface of the windshield glass 32. In this case, the abnormality detection part 22 continuously detects the occurrence of abnormality in the following detection process.

The longer the bird droppings are adhered on the surface of the windshield glass 32, the more the difference is, between the road surface captured before the bird droppings are adhered on the windshield glass 32 and the road surface of the windshield glass 32 obtained in the current detection period. When this difference becomes greater, the estimation accuracy of the road surface estimation part 24, to be performed when at least one of the brightness images contains the image of the wiper blade 31, becomes reduced.

The continuous abnormality detection part 23 determines that the abnormality detected by the abnormality detection part 22 will continuously occur when the number of times indicating affirmation determined by the abnormality detection part 22 is more than a predetermined threshold value (for example, more than two times).

When the continuous abnormality detection part 23 determines that the abnormality detected by the abnormality detection part 22 will continuously occur, the object detection device, i.e. the ECU 20 according to the exemplary embodiment prohibits the road surface estimation part 24 from performing a road surface estimation process and the object detection part 25 from performing an object detection process.

On the other hand, when the continuous abnormality detection part 23 determines that the abnormality detected by the abnormality detection part 22 does not continuously occur, it can be considered that this abnormality did temporarily occur due to the image of the wiper blade 31 generated in at least one of the pair of brightness images captured by the left hand side camera 11 and the right hand side camera 12. For this reason, the road surface estimation part 24 uses, as the currently-detected road surface, the road surface which has been previously estimated at the previous detection period when the abnormality detection part 22 has determined that the image abnormality occurs in at least one of the pair of brightness images captured during the current detection period and the abnormality detection part 22 determines that this abnormality will continuously occur.

Because the left hand side camera 11 and the right hand side camera 12 in the stereo camera mounted on the own vehicle capture and update brightness images at a high speed, if the image capture is performed at high speed there should only be a small difference between consecutive images. Accordingly, when compared with the process of estimating the state of the road surface on the basis of the brightness image containing a temporarily abnormality image area, it is possible for the object detection device according to the exemplary embodiment to correctly estimate a state of the road surface, with high accuracy, in the brightness image captured at the current detection period on the basis of the road surface estimated at the previous detection period.

Figure 7:
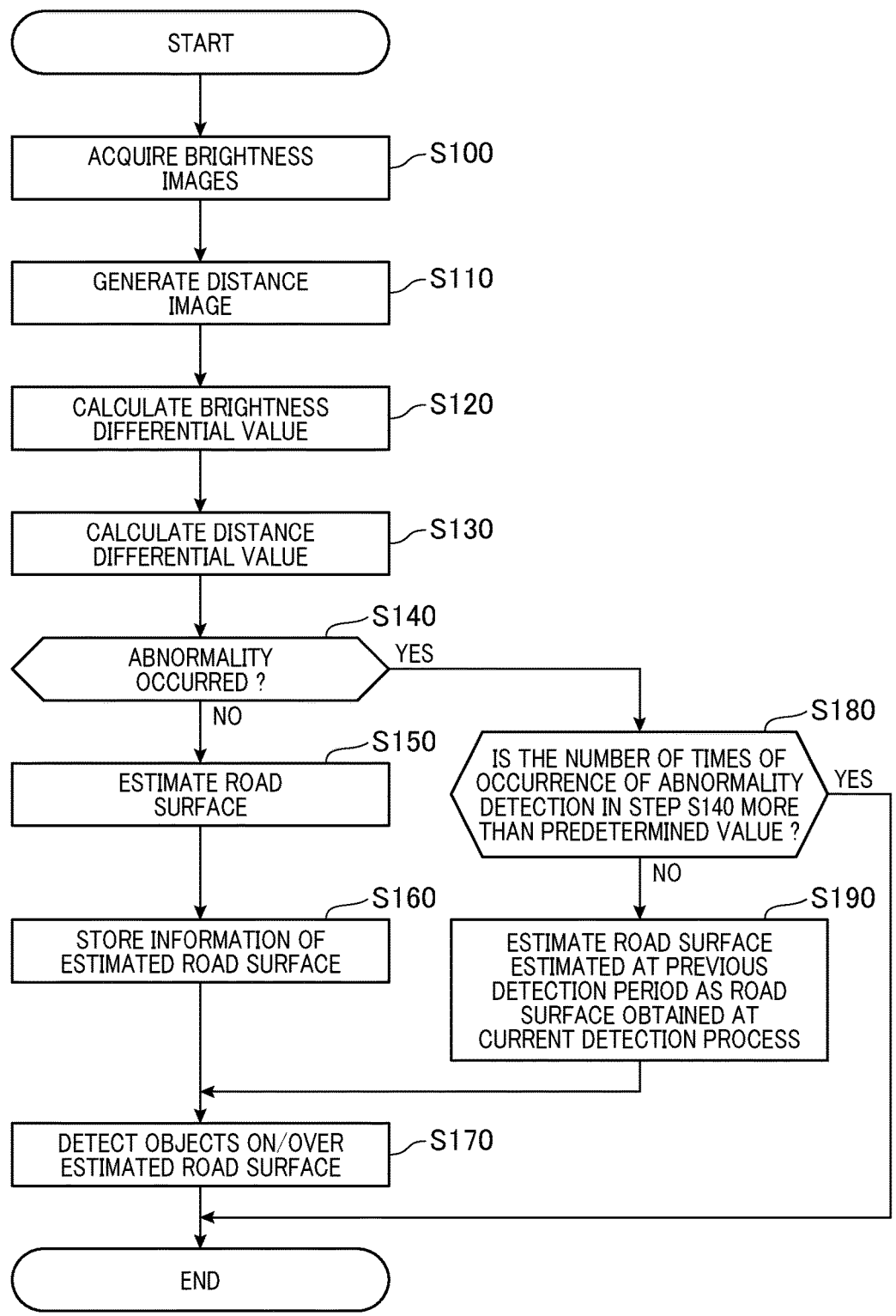
FIG. 7 is a flow chart of an object detection control process executed by an electronic control unit (ECU) as the object detection device according to the exemplary embodiment of the present invention.

FIG. 7 is a flow chart of the object detection control process performed by the electronic control unit (ECU) 20 as the object detection device according to the exemplary embodiment. The ECU 20 as the object detection device according to the exemplary embodiment performs the object detection process shown in FIG. 7. In the object detection control shown in FIG. 7 is periodically performed at predetermined periods by the ECU 20 during the electric power of the ECU 20 is turned on.

In step S100 in the object detection process shown in FIG. 7, the ECU 20 as the distance image generation part 21 receives the pair of brightness images captured by and transmitted from the left hand side camera 11 and the right hand side camera 12. The operation progresses to step S110. In step S110, the ECU 20 generates the distance image on the basis of the received pair of brightness images. The operation progresses to step S120.

In step S120, the ECU 20 divides each of the pair of brightness images obtained in Step S100 into eight divided areas. The ECU 20 divides each of the pair of brightness images obtained in step S100 into eight divided areas, and calculates an average brightness value of each of the divided areas. The ECU 20 further calculates a brightness differential value every corresponding divided area between the average brightness value calculated at the previous detection period and the average brightness value calculated at the current detection period. The operation flow progresses to step S130.

In step S130, the ECU 20 divides the distance image generated in step S110 into eight divided areas, and calculates an average distance value of each of the eight divided areas. The ECU 20 calculates a distance differential value, in each of the eight divided areas, between the average distance value calculated at the previous detection period and the average distance value calculated at the current detection period. The operation flow progresses to step S140.

In step S140, the ECU 20 as the abnormality detection part 22 detects whether there are not less than two divided areas having a brightness differential value of more than the first threshold value and there are not less than two divided areas having a distance differential value of more than the second threshold value in at least one of the brightness images.

When the detection result in step S140 indicates negation ("NO" in step S140), i.e. indicates that there are no divided area having the brightness differential value and there are no divided area having the distance differential value which is more than the second threshold value, the operation flow progresses to step S150.

In step S150, the ECU 20 as the road surface estimation part 24 detects a road surface on the basis of the distance image generated in step S110. The operation flow progresses to step S160. In step S160, the ECU 20 stores information regarding the road surface which has been estimated, i.e. detected in step S150. The operation flow progresses to step S170.

In step S170, the ECU 20 as the object detection part 25 detects one or more objects in the distance image, which are present on/over the road surface estimated in step S150 or step S190. The process in step S190 will be explained later. The ECU 20 finishes the operation of the object detection control process shown in FIG. 7.

On the other hand, when the detection results indicates affirmation ("YES" in step S140), i.e. indicates that there are at least two divided areas having the brightness differential value and there are at least two divided areas having the distance differential value which is more than the second threshold value, the operation flow progresses to step S180. In step S180, the ECU 20 as the continuous abnormality detection part 23 detects whether the number of times indicating affirmation determined in step S140 is more than the predetermined threshold value.

When the detection result in step S180 indicates negation ("NO" in step S180), i.e. indicates that the number of times indicating affirmation determined in step S140 is not more than the predetermined threshold value, the operation flow progresses to step S190. In step S190, the ECU 20 estimates, as the road surface in the current detection period, the road surface which has been estimated in the previous detection period. The operation flow progresses to step S170. On the other hand, when the detection result in step S180 indicates affirmation ("YES" in step S180), i.e. indicates that the number of times indicating affirmation determined in step S140 is more than the predetermined threshold value, the ECU 20 finishes the operation of the object detection control process shown in FIG. 7.

The object detection device according to the exemplary embodiment having the structure previously described has the following effects.

Only when the continuous abnormality detection part 23 determines that the abnormality detected by the abnormality detection part 22 does not continuously occur, the road surface estimation part 24 estimates, as the road surface determined in the current detection period, the road surface which has been estimated in the previous detection period. That is, it is recognized that the road surface detected in the current detection period is the same as the road surface detected in the previous detection period. This allows the road surface estimation part 24 to perform the simple estimation process.

Further, the road surface estimation part 24 performs the estimation process of correctly estimating the road surface even if the image of the wiper blade 31 is contained in the brightness image captured by the stereo camera composed of the left hand side camera 11 and the right hand side camera 12. Accordingly, this makes it possible for the object detection part 25 to correctly detect objects which are present on/over the road surface.

FIG. 8 is a view showing the effects provided by the object detection device according to the exemplary embodiment which performs the object detection control process shown in FIG. 7. For example, there is a distance image which contains the image of the wiper blade 31, by which an object is hidden. That is, this distance image contains an image abnormality area due to the image of the wiper blade 31. The upper-side image in FIG. 8 shows a reference example which does not correctly process the object control process, i.e. does not correctly recognize some objects. On the other hand, the lower-side image in FIG. 8 shows a case according to the present invention which correctly processes the object control process, i.e. correctly recognizes all of the objects.

It is impossible for the ECU 20 to correctly detect some objects on/over the road surface because of performing no object detection control process. That is, because the ECU 20 cannot correctly estimate the presence of the road surface in the upper-side image, it becomes difficult for the ECU 20 to correctly detect the objects on/over the road surface.

On the other hand, because the ECU 20 as the object detection device according to the exemplary embodiment correctly estimates the presence of the road surface in the lower-side image, it is possible to correctly detect all objects on/over the road surface in the image area which contains the image of the wiper blade 31.

When it is detected that there are not less than two divided areas having a brightness differential value of more than the first threshold value and there are not less than two divided areas having a distance differential value of more than the second threshold value in at least one of the brightness images, the abnormality detection part 22 determines that image abnormality occurs in at least one of the pair of brightness images captured during the current detection period. This makes it possible for the ECU 20 as the object detection device according to the exemplary embodiment to detect occurrence of image abnormality in at least one of the pair of brightness images with high accuracy.

The concept of the present invention is not limited by the exemplary embodiment previously described. It is possible to modify the structure and operation of the object detection device.

In the object detection control process according to the exemplary embodiment previously described, the ECU 20 as the object detection device detects that at least one of the pair of brightness images contains the image of the wiper blade 31. However, the concept of the present invention is not limited by this case. It is possible for the object detection device to detect that at least one of the pair of brightness images contains an image of fallen leaves. In this case, there is a possible case in which one divided area contains the image of fallen leaves. In order to solve this phenomenon, it is required to modify the detection process performed by the abnormality detection part 22. Specifically, it is preferable for the ECU 20 as the object detection device to detect whether there is not less than one divided area having the brightness differential value which is more than the first threshold value, and there is not less than one divided area having the distance differential value which is more than the second threshold value.

In the object detection device according to the exemplary embodiment previously described, the abnormality detection part 22 determines the occurrence of image abnormality in at least one of the pair of brightness images captured during the current detection period only when there are not less than two divided areas having a brightness differential value of more than the first threshold value and there are not less than two divided areas having a distance differential value of more than the second threshold value in at least one of the brightness images.

However, the concept of the present invention is not limited by this. It is acceptable for the abnormality detection part 22 to detect occurrence of image abnormality in at least one of the brightness images captured during the current detection period only when there are not less than two divided areas having a brightness differential value of more than the first threshold value in at least one of the brightness images. It is also acceptable for the abnormality detection part 22 to detect occurrence of image abnormality in at least one of the brightness images captured during the current detection period only when there are not less than two divided areas having a distance differential value of more than the second threshold value in at least one of the brightness images.

Further, in the object detection device according to the exemplary embodiment previously described, the abnormality detection part 22 determines whether there are not less than two divided areas having a brightness differential value which is more than the first threshold value in at least one of the brightness images. That is, the abnormality detection part 22 uses both the brightness images captured by the left hand side camera 11 and the right hand side camera 12 so as to detect occurrence of image abnormality. However, the concept of the present invention is not limited by this. It is acceptable for the abnormality detection part 22 to use one brightness image which contains the image of the wiper blade 31 only because there is a high possibility of the image of the wiper blade 31 being contained in one of the brightness images. Specifically, the abnormality detection part 22 detects whether there are not less than two divided areas having a brightness differential value of not less than the first threshold value in one of the brightness images, which has a high possibility of containing the image of the wiper blade 31. This makes it possible for the abnormality detection part 22 to perform a simple detection process of detecting occurrence of abnormality.

In the object detection device according to the exemplary embodiment previously described, the road surface estimation part 24 estimates the road surface in the brightness image captured during the current detection period only when the abnormality detection part 22 detects occurrence of image abnormality in at least one of the brightness images captured during the current detection period, and the continuous abnormality detection part 23 determines that the abnormality detected by the abnormality detection part 22 does not continue. However, the concept of the present invention is not limited by this. It is acceptable to avoid the detection process performed by the continuous abnormality detection part 23. More specifically, it is acceptable for the road surface estimation part 24 to estimate the road surface in the brightness image only when the abnormality detection part 22 determines occurrence of image abnormality in at least one of the brightness images captured during the current detection process.

In the object detection device according to the exemplary embodiment previously described, the road surface estimation part 24 estimates the road surface in the brightness image captured during the current detection period when the image abnormality detected by the abnormality detection part 22 does not continue in the brightness image. For example, it is acceptable for the road surface estimation part 24 to estimate, as the road surface obtained during the current detection period, the road surface on the basis of the brightness image captured during the previous detection period when the image abnormality detected by the abnormality detection part 22 does not continue in the brightness image. More specifically, the ECU 20 calculates an equation representing a straight line which connects points forming the road surface estimated in the previous detection period, and uses the obtained equation so as to estimate the road surface in the brightness image captured during the current detection period. It is also possible to calculate a coefficient on the basis of slopes of the equations calculated during a plurality of previous detection periods, and to correct the equation on the basis of the calculated coefficient.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An object detection device receiving a pair of brightness images as front view images in front of an own vehicle every predetermined detection period, transmitted from a stereo camera, the object detection device comprising a computer system including a central processing unit, the computer system being configured to provide:
   a distance image generation part generating a distance image, which represents a distribution of a distance value corresponding to a position on the brightness images on the basis of the pair of brightness images;

a road surface estimation part estimating a road surface on the basis of the distance image generated by the distance image generation part;

an object detection part which groups positions, each of the positions having a distance value located on/over the road surface estimated by the road surface estimation part and satisfying a predetermined relationship, and detecting an object on the basis of the grouped positions; and an abnormality detection part comparing at least one of the pair of brightness images and the distance image with a corresponding brightness image or distance image obtained during a previous detection period which is before a current detection period, and detecting occurrence of abnormality in the brightness image or the distance image obtained during the current detection period on the basis of a comparison result, wherein the road surface estimation part estimates the road surface at the current detection period on the basis of the road surface estimated at the previous detection period based on the abnormality detection part detecting the occurrence of abnormality in the brightness image or the distance image obtained at the current detection period.

2. The object detection device according to claim 1, wherein the road surface estimation part uses the road surface estimated at the previous detection period as the road surface estimated at the current detection period based on the abnormality detection part detecting abnormality in the brightness image or the distance image obtained at the current detection period.

3. The object detection device according to claim 1, wherein the own vehicle is further equipped with a wiper device comprising wiper blades to remove foreign matter adhered on a surface of a windshield glass of the own vehicle from the windshield glass, and the abnormality detection part compares one of the brightness images, which contains an image of the wiper blade with the brightness image captured at the previous detection period, and detects occurrence of abnormality in the brightness image on the basis of the comparison result.

4. The object detection device according to claim 1, wherein the own vehicle is further equipped with a wiper device comprising wiper blades to remove foreign matter adhered on a surface of a windshield glass of the own vehicle from the windshield glass, the object detection device further comprises:

an average brightness value calculation part which divides each of the pair of brightness images into plural divided areas, and calculates an average brightness value of each of the plural divided areas; and a brightness differential value calculation part which calculates a brightness differential value between the average brightness value obtained at the previous detection period and the average brightness value obtained at the current detection period in each of the pair of the brightness images, wherein the abnormality detection part determines that the image of the wiper blade is contained in at least one of the pair of brightness images captured during the current detection period based on there not being less than two divided areas having a brightness differential value which is more than a first threshold value in at least one of the pair of brightness images captured during the current detection period.

5. The object detection device according to claim 1, wherein the own vehicle is further equipped with a wiper device comprising wiper blades to remove foreign matter adhered on a surface of a windshield glass of the own vehicle from the windshield glass, the object detection device further comprises:

an average distance value calculation part which divides each of the pair of brightness images into plural divided areas, and calculates an average distance value of distance values in each of the plural divided areas; and a distance differential value calculation part which calculates a distance differential value between an average distance value calculated at the previous detection period and an average distance value calculated at the current detection period, wherein the abnormality detection part detects that the image of the wiper blade is contained in at least one of the pair of brightness images captured during the current detection period based on there not being less than two divided areas having a distance differential value which is more than a second threshold value.

6. The object detection device according to claim 1, wherein the own vehicle is further equipped with a wiper device comprising wiper blades to remove foreign matter adhered on a surface of a windshield glass of the own vehicle from the windshield glass, the object detection device further comprises:

an average brightness value calculation part which divides each of the pair of brightness images into plural divided areas, and calculates an average brightness value of each of the plural divided areas;

a brightness differential value calculation part which calculates a brightness differential value between the average brightness value calculated at the previous detection period and the average brightness value calculated at the current detection period in each of the pair of the brightness images;

an average distance value calculation part which calculates an average distance value of distance values in each of the plural divided areas; and a distance differential value calculation part which calculates a distance differential value between an average distance value calculated at the previous detection period and an average distance value calculated at the current detection period, wherein the abnormality detection part detects that the image of the wiper blade is contained in at least one of the pair of brightness images captured during the current detection period (1) based on there not being less than two divided areas having a brightness differential value which is more than a first threshold value in at least one of the pair of brightness images captured during the current detection period, and (2) based on there not being less than two divided areas having a distance differential value which is more than a second threshold value.

7. The object detection device according to claim 1, wherein based on the number of times of occurrence of abnormality being less than a predetermined threshold value, the abnormality detection part compares at least one of the pair of brightness images and the distance image with the brightness image captured during the previous detection period and determines occurrence of abnormality in the brightness image captured during the current detection period on the basis of the comparison result.

8. An object detection device receiving a pair of brightness images as front view images in front of an own vehicle every predetermined detection period, transmitted from a stereo camera, the object detection device comprising a computer system including a central processing unit, the computer system being configured to provide:
- a distance image generation part generating a distance image, which represents a distribution of a distance value corresponding to a position on the brightness images on the basis of the pair of brightness images;
- a road surface estimation part estimating a road surface on the basis of the distance image generated by the distance image generation part;
- an object detection part which groups positions, each of the positions having a distance value located on/over the road surface estimated by the road surface estimation part and satisfying a predetermined relationship, and detecting an object on the basis of the grouped positions; and
- an abnormality detection part detecting occurrence of abnormality in the brightness image or the distance image obtained during a current detection period based on comparing at least one of the brightness image and the distance image with an image obtained during a previous detection period which is before the current detection period, wherein the road surface estimation part estimates the road surface at the current detection period on the basis of the road surface estimated at the previous detection period based on the abnormality detection part detecting the occurrence of abnormality in the brightness image or the distance image obtained at the current detection period.

9. An object detection method performed by a computer system including a CPU as a central processing unit and a computer-readable memory mounted on an own vehicle equipped with a stereo camera, wherein the CPU receives a pair of brightness images, as front view images of the own vehicle on a road on which the own vehicle is driving, transmitted from the stereo camera every predetermined detection period, and the CPU stores the pair of brightness images into the computer-readable memory, the object detection method comprising steps of:
- generating a distance image, which represents a distribution of a distance value corresponding to a position on the brightness images on the basis of the pair of brightness images, and storing the distance image into the computer-readable memory;
- estimating a road surface state of the road on the basis of the distance image, and storing the road surface state of the road into the computer-readable memory;
- grouping positions as grouped positions, each of the positions having a distance value located on/over the road surface state of the road and satisfying a predetermined relationship, and detecting an object on the basis of the grouped positions; and
- comparing at least one of the pair of brightness images and the distance image stored in the computer-readable memory with a corresponding brightness image or distance image stored in the computer-readable memory,
- obtained during a previous detection period which is before a current detection period,
- detecting occurrence of abnormality in the brightness image or the distance image obtained during the current detection period on the basis of a comparison result, and
- estimating the road surface state of the road is estimated at the current detection period on the basis of the road surface of the road estimated at the previous detection period based on the occurrence of abnormality in the brightness image or the distance image obtained at the current detection period being detected.

* * * * *